United States Patent [19]

Taillardat

[11] 3,924,486

[45] Dec. 9, 1975

[54] SCREW AND NUT TRANSMISSION MECHANISM

[75] Inventor: Jacques Taillardat, Saint Alban-en-Leysse, France

[73] Assignee: La Technique Integrale, Chambery, France

[22] Filed: Oct. 30, 1973

[21] Appl. No.: 411,120

[30] Foreign Application Priority Data
Oct. 30, 1973 France .............................. 73.38458

[52] U.S. Cl............................ 74/459; 74/424.8 R
[51] Int. Cl.² ........................................ F16H 1/20
[58] Field of Search ..................... 74/424.8, 459

[56] References Cited
FOREIGN PATENTS OR APPLICATIONS
897,008  5/1962  United Kingdom ................. 74/459
1,244,838  9/1960  France ............................... 74/459
530,561  7/1954  Belgium ............................. 74/459

*Primary Examiner*—Benjamin W. Wyche
*Assistant Examiner*—Wesley S. Ratliff, Jr.
*Attorney, Agent, or Firm*—Daniel M. Rosen

[57] ABSTRACT

This ball screw and nut mechanism comprises in its nut a longitudinal groove for the ball re-circulation, which is formed in a key, engaging a longitudinal groove machined in the outer surface of the nut. This mechanism is intended for converting a movement of rotation into a movement of translation, and vice versa.

3 Claims, 5 Drawing Figures

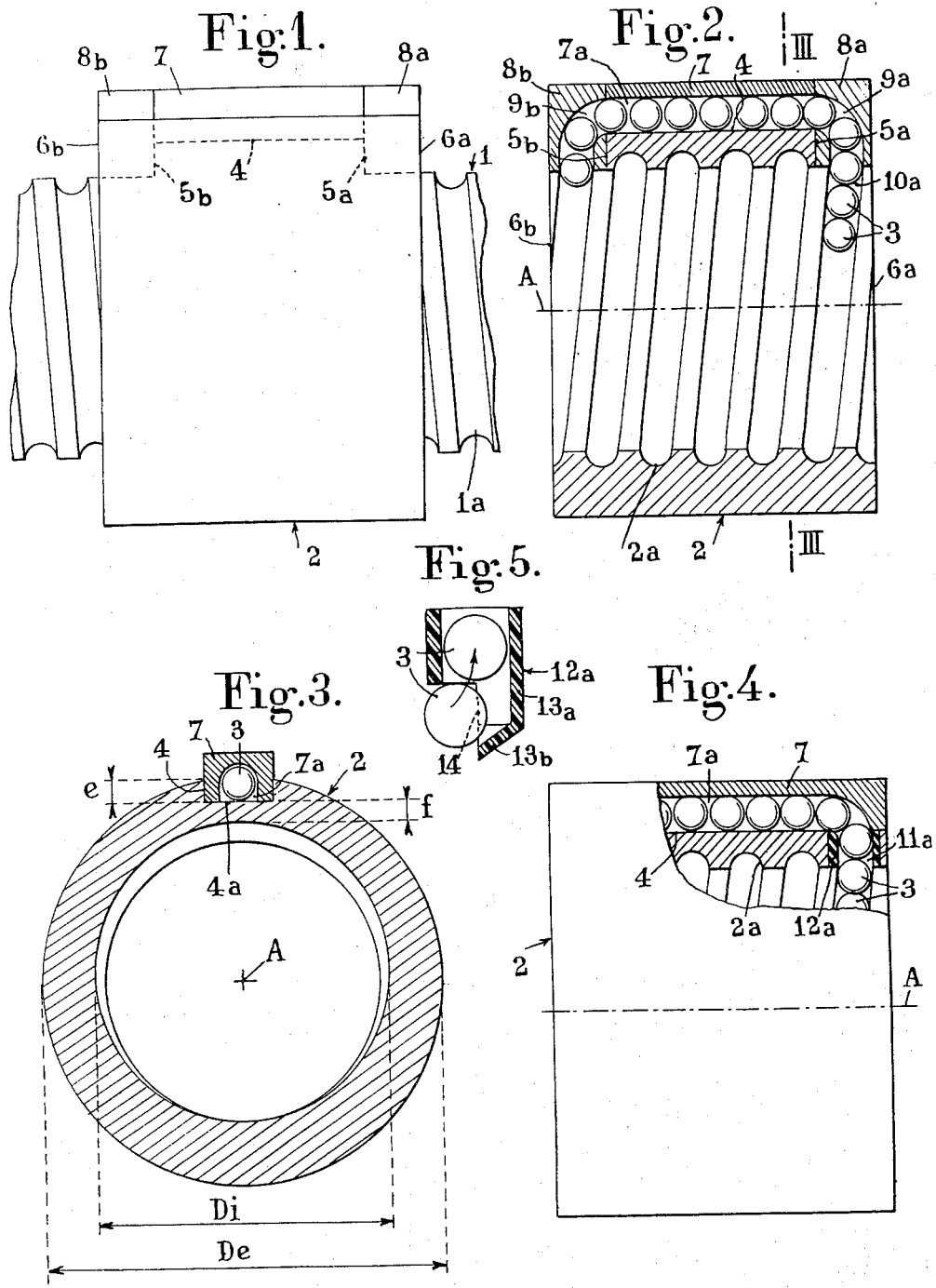

3,924,486

SCREW AND NUT TRANSMISSION MECHANISM

BACKGROUND OF THE INVENTION

This invention relates to a ball screw and nut transmission mechanism for converting a movement of rotation into a movement of translation, and vice versa.

In mechanisms of this type the relative helical movement produced in operation between the screw and nut causes the balls to travel along at least one helical channel bounded by a nut thread and by the corresponding or registering portion of a screw thread, from the first end of this helical channel which is adjacent to one end face of said nut to its opposite end located near the other end face of the nut, means being provided for returning the balls from said opposite end of the helical channel to its first end, notably in the form of an auxiliary, so-called "ball re-circulation" channel.

Some of these known mechanisms for transforming movements comprise a nut provided with at least one peripheral ball re-circulation channel substantially parallel to the nut axis and interconnecting the two ends of a same thread of said nut which are located near the end faces thereof, respectively. This type of construction is attended by the advantage that the nut thread or threads are utilized substantially throughout their length for transmitting efforts between the screw and nut. The weak points of the transmission, which correspond to the points of transfer of the balls from the helical channel to the re-circulation channel, are very few. On the other hand, this construction is objectionable in that the outer diameter of the nut must be relatively great, and this may prove detrimental in certain applications.

To avoid these inconveniences of known embodiments of the screw and nut mechanisms, various types of ball recirculation channels lying not entirely within the nut but in the threaded portion thereof which co-act with the screw have already been proposed. It is obvious that this construction permits the outer diameter of the nut to be reduced considerably in comparison with the screw diameter. Moreover, this solution is advantageous in that the means usually provided on the end faces of the nut for interconnecting the ends of the helical channel and those of the re-circulation channel, which means constitute troublesome projections on said end faces, can be dispensed with. However, in most of these last-mentioned constructions each nut thread is not utilized throughout its length for transmitting efforts between the screw and nut, due to the axial space occupied by the re-circulation channel or channels and, therefore, the maximum effort transmissible to or from a nut of predetermined length is reduced.

SUMMARY OF THE INVENTION

The movement transforming mechanism according to this invention is of the first-mentioned, that is, with a nut comprising at least one peripheral ball re-circulation channel substantially parallel to the nut axis and interconnecting the two ends of a same thread of said nut which lie near one of its end faces. This arrangement is free of the inconveniences described hereinabove, characteristic of the two known types of mechanisms, while preserving substantially the sum of their advantages.

The screw and nut mechanism with ball circulation according to this invention is characterised in that the ball re-circulation channel is formed at least on the major portion of its length in a key or like insert fitted partially in a longitudinal groove of same length, machined in the outer surface of the nut and parallel to the nut axis, said channel comprising preferably a groove machined in the face of said key engaging the bottom of the longitudinal groove of said nut.

In a preferred embodiment of the mechanism of this invention the depth of the longitudinal groove formed in the outer surface of the nut is smaller than half the ball diameter. The outer diameter of the nut in a mechanism according to this invention may thus be considerably smaller than in conventional and known mechanisms of the same type, and more as small as in those mechanisms having a re-circulation channel located near the threaded surface of the nut.

BRIEF DESCRIPTION OF THE DRAWING

Two typical embodiments of the movement converting mechanism according to this invention will now be described by way of example with reference to the attached drawings, in which:

FIG.1 is a side elevational view showing one portion of a first form of embodiment.

FIG. 2 is an axial section showing the nut of the embodiment of FIG. 1. FIG. 3 is a section taken along the line III—III of FIG. 2.

FIG. 4 is a detail view showing in fragmentary section the nut of a modified embodiment, and FIG. 5 is a detail view showing on a larger scale an element of this alternate embodiment.

DESCRIPTION OF THE PREFERRED EMBODIMENTS

In FIG. 1, the reference numeral 1 designates a screw having a single thread consisting of a helical groove 1a of semi-circular cross-sectional contour. This thread 1a is machined in the lateral surface of the screw 1. A cylindrical nut 2 has also machined in its inner surface a helical groove 2a of same pitch and cross-section as said helical groove 1a of screw 1. The sections of the helical grooves 1a and 2a are so selected that when the nut 2 engages the screw 1 as shown in FIG. 1 with the interposition of balls 3 (FIG. 2) having a predetermined diameter between their relevant threads, the helical groove 2a of nut 2 and the registering or corresponding portion of the helical groove 1a of screw 1 provide therebetween a helical channel having a diameter slightly greater than $d$, in which the balls 3 can circulate while co-acting both with the side faces of the thread of nut 2 and with those of the thread of the screw 1.

Machined in the outer surface of the nut 2 is a longitudinal groove or keyway 4 parallel to its axis A and of adequate size, said keyway having side walls spaced apart a width distance w and a floor intermediate said side walls. The two ends of this groove 4 open into the bottoms of a pair of transverse grooves 6a, 6b formed in said nut 2. A key 7 having the same length and corresponding width as said groove 4 and partially engaging the latter has its inner face or bottom surface contacting the registering bottom face or floor 4a of groove 4. This key 7 has formed therein a groove 7a opening towards the bottom face 4a of groove 4 so as to constitute therewith a re-circulation channel of a size sufficient to permit the free passage of balls 3 therein. Two inserts 8a and 8b are secured in the two radial grooves 5a and 5b, respectively. Each insert 8a, 8b has formed therein ball-guiding passage 9a or 9b extending substantially radially and connected without any discontinuity in its curvature, that is through sections having a regular curvature, on the one hand to the adjacent end of the re-circulation channel 7a formed in said key 7 and on the other hand to the adjacent end of the helical groove 2a of nut 2 (only the end 10a of said helical groove 2a is visible in FIG. 2). The aforesaid guide inserts 8a, 8b may be made for instance according to the disclosure given in the French patent application No. 72.37324 filed on Oct. 20, 1972 by the Societe Anonyme dite LA TECHNIQUE INTEGRALE for "Improvements in Screw and Nut Mechanisms," and notably in the Claims 1 to 5 of said French patent application. The key 7 together with the guide inserts 8a and 8a may be made from medium-strength material since they are subjected only to very moderate stress from the balls travelling along their passages. As shown in FIG. 3 of the attached drawings, key 7 having at its end guide inserts 8a and 8b may also constitute a member for rotatably coupling the nut 2 to another machine element, which would be consistent with the use of the term "key" hereinabove. In this case, the key 7 and guide inserts 8a, 8b must of course be so dimensioned, from the point of view of the strength of material, that they can transmit the maximum effort contemplated between the nut and screw, and also to and from the machine element to be rotatably coupled to said nut.

The members 7, 8a and 8b are secured in the corresponding grooves 4, 5a and 5b in any suitable and known manner. Thus, these member may be force-fitted or cemented in to the relevant grooves. Alternatively, at least some of the grooves or cavities 4, 5a and 5b and their corresponding members 7, 8a and 8b may be given a substantially trapezoidal configuration so that they can fit into one another, various known means being also provided, if desired, for locking the members 8a and 8b in the radial direction, for example as disclosed in claim 3 of the above-mentioned patent application number.

If desired, the outer diameter De of nut 2 may be relatively small in comparison with its inner diameter Di and with the rated diameter of screw 1, by selecting the depth e of groove or keyway 4 smaller than one-half of the ball diameter d/2 (in this case, of course, the portion of key 7 that projects from the outer surface of nut 2 has a radial thickness appreciably greater than d/2). Thus, if $f$ denotes the difference between the radial width of the nut and e (see FIG. 3):

$$De \cong Di + 2f + 2e < Di + 2f + d \quad (1)$$

On the other hand, if we consider a movement converting mechanism of known type as mentioned hereinabove, in which the ball re-circulation takes place at the level of the threaded surface of the nut, it can easily be proved that the outer diameter of the nut should have a minimum value:

$$De \geq Di + 2g \quad (2)$$

wherein $g$ denotes the minimum radial thickness of the nut.

A comparison between the above relationships (1) and (2) shows that it is only necessary to select for the nut element of the mechanism of this invention a value of $f$ equal to $g$ for obtaining in said nut an outer diameter smaller than the minimum diameter of the nuts of the hitherto known mechanisms of the corresponding type.

Of course, many modifications and variations may be brought to the embodiment illustrated in FIGS. 1 to 3 of the drawings. These may consist, inter alia, in selecting different shapes and dimensions for the key 7 and the guide inserts 8a and 8b. This also applies to the passages 7a, 9a and 9b, and more particularly, the passage 7a, instead of consisting of an open groove, may be embedded completely in the material of key 7.

In the modified embodiment illustrated in FIG. 4 the groove 4 of nut 2 and key 7 engaged therein have the same axial length as the nut 2 itself. In other words, the elements designated by the reference symbols 7, 8a and 8b in FIG. 1 and 2 are assembled to constitute a single unit partially engaged into the longitudinal groove 4 machined in the outer surface of nut 2, parallel to the nut axis A, with the same depth throughout the axial length of said nut. In this case, the two ends of the re-circulation channel 7a are curved in order to guide the balls 3 towards two passage holes such as 11a formed in the thickness of the nut wall, adjacent the corresponding ends of its helical groove 2a. In the example illustrated the inner wall of each hole is lined with a socket such as 12a, for example of synthetic material, having dimensions suitable to permit the free passage of the balls 3 from the ends of the re-circulation channel 7a to those of the helical groove 2a of nut 2. FIG. 5 illustrates in section and in detail this socket 12a, the section being taken in a plane perpendicular to that of FIG. 4. It will be seen that the socket 12a comprises at its lower end elements 13a and 13b (not visible in FIG. 4) since they are on this side of the section plane) for intercepting the balls 3 penetrating into the lower end of the socket 12a through a side notch 14 so that the balls 3 are properly guided towards the upper end of said socket 12a.

The screw and nut members of the mechanism of this invention for converting a movement of rotation into a movement of translation, or vice versa, may also comprise more than one helical groove, in order to provide a plurality of helical channels for the ball circulation. In this case, a re-circulation channel formed at least on the major part of the length of a key partially engaged in a longitudinal groove machined in the outer surface of the nut, parallel to its axis, must be provided for each helical channel, that is, for each helical groove of said nut 2. In the arrangement comprising a nut and a screw each provided with, for example, two threads, two keys such as 7 must be provided, notably in the embodiment shown in FIG. 4, each key comprising a groove such as 7a. The relative angular disposal of the two keys is optional, but an advantageous arrangement consists in disposing them in a common axial plane of the nut, on either side of its axis A.

The nut of the mechanism according to this invention may also comprise one or more collars for fastening the nut to other machine elements. In this case each collar contemplated must comprise at its base a notch permitting the engagement of the key (7 in FIG. 4) into the groove 4 of said nut.

What is claimed as new is:

1. Screw and nut mechanism for converting a movement of rotation into a movement of translation, and vice versa, comprising a screw member and a mating nut member having a common axis, each of said members having at least one peripheral helical groove, which grooves define together at least one helical channel having two ends, a train of balls of predetermined diameter engaged in said helical channel for transmitting forces between said members, at least one substantially straight keyway in the outer peripheral surface of said nut member, said keyway extending parallel to the common axis of said numbers and having side walls spaced apart a width distance, and a floor intermediate said side walls, said keyway having depth in the radial direction less than one-half of said diameter of said balls, an elongated key having side walls spaced apart a width distance corresponding to that of said keyway, and intermediate said side walls a bottom surface including therein a longitudinal channel having cross-section permitting passage of said balls, said key being secured in said keyway with the bottom surface and groove therein facing and adjacent said floor of the keyway, said groove and floor defining a partial ball-recirculation passage including two ends, and connection means for interconnecting the ends of said passage with the ends of said helical channel.

2. Apparatus according to claim 1, wherein said nut member has opposite end portions, and wherein said connection means comprises said end portions with radially extending holes therein interconnecting ends of said recirculation passage with ends of said helical channel.

3. Mechanism as set forth in claim 1, wherein said nut keyway and said key have the same axial length as the nut member.

* * * * *